United States Patent [19]

Hanson

[11] 4,208,926
[45] Jun. 24, 1980

[54] NUTATING DRIVE

[75] Inventor: Edwin E. Hanson, Peoria, Ill.

[73] Assignee: Caterpillar Tractor Co., Peoria, Ill.

[21] Appl. No.: 958,908

[22] Filed: Nov. 8, 1978

[51] Int. Cl.² .............................................. F16H 15/16
[52] U.S. Cl. ........................................ 74/191; 74/190
[58] Field of Search ................. 74/191, 192, 193, 190, 74/690, 796

[56] References Cited

U.S. PATENT DOCUMENTS

| Re. 29,328 | 8/1977 | Kemper | 74/690 X |
|---|---|---|---|
| 3,224,300 | 12/1965 | Chery | 74/796 |
| 3,630,095 | 12/1971 | Eakin | 74/191 |
| 3,910,137 | 10/1975 | Nedeljkovitch | 74/190 X |
| 4,112,780 | 9/1978 | Kemper et al. | 74/191 |

FOREIGN PATENT DOCUMENTS

| 2634244 | 2/1977 | Fed. Rep. of Germany | 74/191 |
|---|---|---|---|
| 2750694 | 5/1978 | Fed. Rep. of Germany | 74/190 |
| 614948 | 12/1926 | France | |
| 729262 | 7/1932 | France | 74/190 |
| 554545 | 1/1957 | Italy | 74/191 |
| 7508640 | 2/1976 | Netherlands | 74/191 |
| 88793 | 4/1921 | Switzerland | 74/190 |
| 269282 | 10/1950 | Switzerland | 74/191 |

OTHER PUBLICATIONS

Vadetec Publication 1 page.

*Primary Examiner*—Leslie Braun
*Attorney, Agent, or Firm*—Phillips, Moore, Weissenberger, Lempio & Majestic

[57] ABSTRACT

Nutating drives of the prior art have suffered from a problem of rotational unbalance. Such drives (10) include an outer rotatable structure (14) rotatable about its axis (16) and having a generally cylindrical cavity (18) axially therein, an axis (20) of said cavity being at an angle from the axis of rotation (16) of the rotatable structure (14), a generally cylindrical nutatable member (22) nutatably mounted within said cavity and a generally conically surfaced member (26) in contact with a generally cylindrical surface (28) of the nutatable member (22), said generally conically surfaced member (26) having an output shaft (30) generally coaxial with the axis of the rotatable structure. This problem of the prior art is solved by a structure which does not create rotational unbalance and which allows full nutation of the nutatable member while preventing it from rotating.

26 Claims, 3 Drawing Figures

FIG—1

NUTATING DRIVE

TECHNICAL FIELD

The invention relates to nutating drives of the type wherein power is transmitted from a cylindrical member to a conically surfaced member.

BACKGROUND ART

Nutating traction drives of the type wherein a case surrounds and rotatably mounts an outer rotatable structure which has a cylindrical cavity therein with the axis of the cavity being at a non-zero angle from the rotational axis of the rotatable structure and a cylindrical nutatable member nutating within the cavity with the nutatable member having a central cylindrical void in which there is a conically sufaced roller which is in frictional contact with the walls defining the void, are well known. In such a system an output shaft proceeds from the conically surfaced roller and is generally coaxial with the axis of the rotatable structure. For such structures to operate efficiently, it is necessary that the nutatable member be restrained from rotating while it nutates. The prior art attains this restriction from rotation of the nutatable member generally by providing a rigid ground member which is attached to the nutatable member adjacent one end thereof. The ground member has integrally attached thereto a ball or other structure which is constrained within a single slot mounted to the case containing the entire drive. The slot is axially extending and, hence, the nutatable member can nutate since the ball will slide axially during this movement, but, the nutatable member cannot rotate since the slot encloses the ball and completely prevents rotation thereof. The nutatable member overhangs beyond the rotatable member and this overhanging plus the weight of the ground member and friction forces unevenly developed by the interaction between the ball and slot, creates rotational unbalance in the overall structure.

One typical nutating drive of the prior art is found in U.S. Pat. No. 3,224,300 issued Dec. 21, 1965 to Walter V. Chery.

DISCLOSURE OF INVENTION

The present invention solves one or more of the problems as set out above.

In one aspect of the present invention, there is provided an improvement in a nutating drive having an outer rotatable structure having a rotational axis, a generally cylindrical cavity axially therein, an axis of said cavity being at an angle relative to the rotational axis of said rotatable structure, a generally cylindrical nutatable member nutatingly movable within said cavity and a member having a surface of a generally conical configuration in contact with a generally cylindrical surface of the nutatable member, said generally conically surfaced member having an output shaft generally coaxial with the rotational axis of said rotatable structure. The improvement comprises means for maintaining the nutatable member against rotation, maintaining nutational freedom therefore, and maintaining the drive in rotational balance.

The structure of the prior art has the disadvantage of being in overall rotational imbalance because part of the nutatable member must overhang beyond the rotatable member for attachment to the ground member. Further, the ground member itself adds to the rotational imbalance both due to its own weight and frictional forces unevenly applied thereby to the overhanging end of the nutatable member. This rotational imbalance can limit the rotational speed which can be permitted due to the inertial loads which are created by the rotational imbalance. A solution to this problem of rotational imbalance would thus constitute a significant contribution to the art.

BRIEF DESCRIPTION OF DRAWINGS

The invention will be better understood by reference to the figures of the drawings wherein like numbers denote like parts throughout and wherein.

BEST MODE FOR CARRYING OUT THE INVENTION

Figure 1:
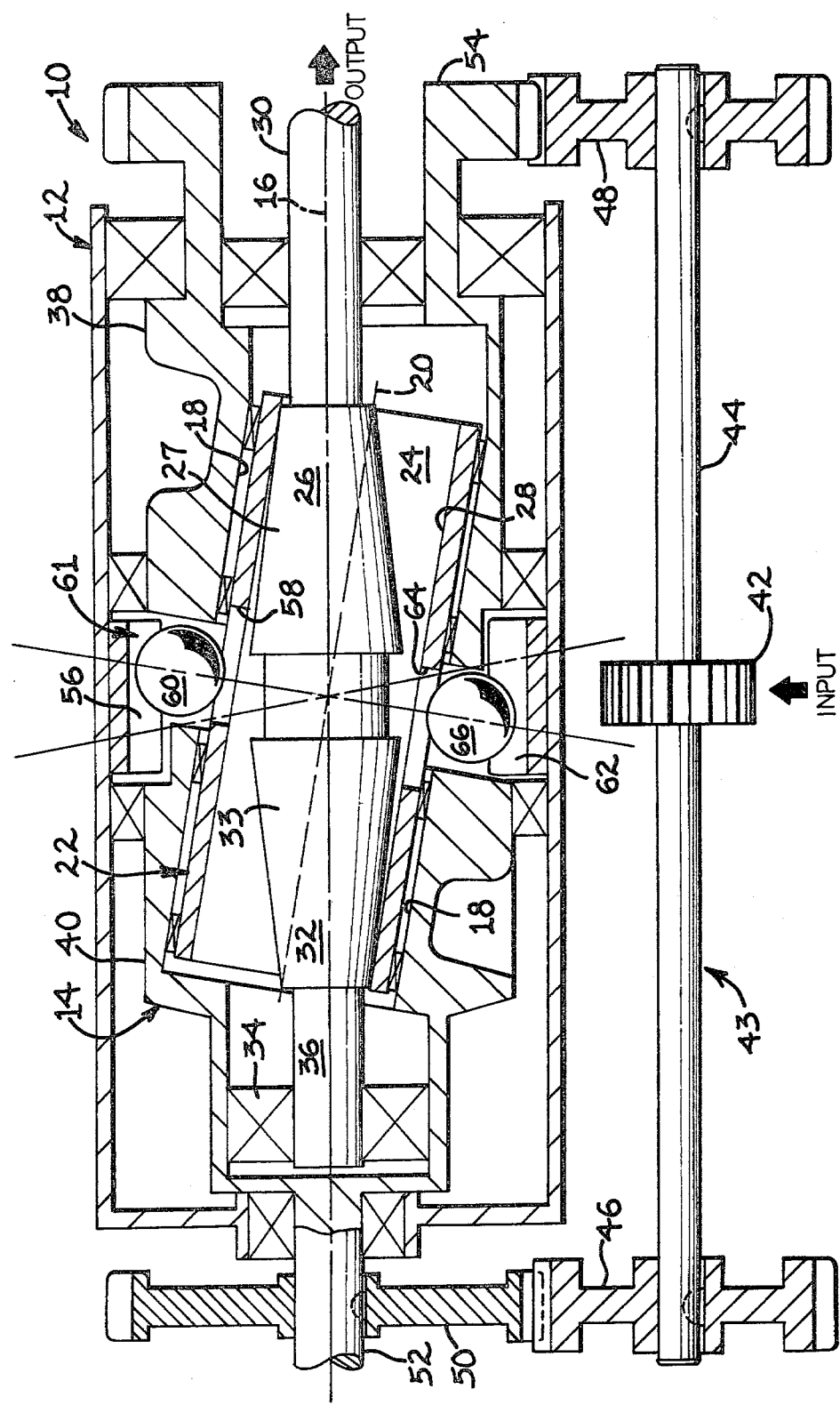
FIG. 1 illustrates in side sectional view, partially schematically, a first embodiment, in accordance with the present invention.

Embodiment of FIG. 1

Adverting to FIG. 1, there is illustrated therein a nutating device 10, generally of a traction nature, which has a relatively stationary member in the form of a case 12, an outer rotatable structure 14 within the case 12, the rotatable structure 14 rotating about its axis 16 and having a generally cylindrical cavity 18 therein, an axis 20 of the cavity 18 being at an (non-zero) angle from the rotational axis 16 of the rotatable structure 14. A generally cylindrical nutatable member 22 is nutatingly mounted within the cavity 18. The nutatable member 22 has a central generally cylindrical void 24 axially therein. A first roller 26 has a surface 27 of a generally conical configuration with said surface 27 being in frictional contact with a generally cylindrical interior wall 28 which defines the generally cylindrical void 24. The first conically surface roller 26 has an output shaft 30 extending therefrom generally coaxially with the axis 16 of the rotatable structure 14. In the embodiment of FIG. 1 an additional or second roller 32 which has a surface 33 of a generally conical configuration is provided with said surface 33 in (frictional) contact with the generally cylindrical nutatable member 22. The second roller 32 extends from the first conically surfaced roller 26 coaxially with the output shaft 30 and extends in an opposite direction therefrom. Bearing means 34 serve for bearingly maintaining the second roller 32 coaxial with the first roller 26. In the particular embodiment illustrated the bearing means 34 receives a stub shaft 36 which extends axially from the smaller end of the second conically surfaced roller 32.

In the embodiment of FIG. 1 it will be noted that the rotatable structure 14 includes a first rotatable member 38 generally about the first roller 26 and a second rotatable member 40 generally about the second roller 32. The first rotatable member 38 and the second rotatable member 40 are axially spaced from one another for reasons which will soon become apparent. As will be noted, means 43 are provided for drivingly rotating the first rotatable member 38 and the second rotatable member 40 from a common input gear 42. As the input gear 42 rotates, this causes a shaft 44 to rotate which rotates a pair of gears 46 and 48. The gear 46 rotates a gear 50 which in turn rotates an axial shaft 52 which communicates with the second rotatable member 40. Meanwhile, the gear 48 rotates a gear 54 which directly rotates the first rotatable member 38. The gears 46 and 48 are of the same size as are the gears 50 and 54 whereby the first rotatable member 38 and the second rotatable member 40 rotate at the same speed and generally about the same rotational axis 16.

In accordance with the present invention an axially extending first slot 56 is carried interiorly by the case 12. A second axially extending slot 58 is carried centrally (adjacent the center of gravity) by the nutatable member 22. The first slot 56 and the second slot 58 are aligned adjacent one another. Means are carried by the aligned slots 56 and 58 for preventing the nutatable member 22 from rotating. In the embodiment illustrated these means comprises a ball 60 which sits in the slots 56 and 58. It will be clear that the ball 60 can move axially within the aligned slots 56 and 58 but since the diameter of the ball 60 is made larger than the respective widths of the first slot 56 and the second slot 58, rotation of the nutatable member 22 is completely prevented. Thus, one attains basically a universal joint 61 comprising the slots 56 and 58 and the ball 60 which allows full nutational freedom to the nutatable member 22 but which does not allow any rotation thereof. Further, one attains this without creating rotational unbalance in the drive 10. It will be further noted by reference to FIG. 1 that at least one additional axially extending first slot 62 is preferably provided carried by the case 12 and at least one additional second slot 64 is preferably provided carried by the nutatable member 22 with an additional ball 66 of larger diameter than the respective widths of the first and second additional slots 62 and 64 being positioned in contact with both of said slots for aiding in preventing the nutatable member 22 from rotating while allowing complete nutational motion thereto. As a practical matter, at least three equally spaced slot-ball arrangements are preferred to smooth operation, with the drawings illustrating structures with four such arrangements, only two of which are seen in the sectional views as drawn.

It should be noted that the slots 56 and 58 and 62 and 64 are axially extending so as to allow axial movement of the respective balls 60 and 66. The slots 56, 58, 62 and 64 will normally be angled from the axial direction to provide for constant velocity operation in a conventional manner as is used, for example, in commercial constant velocity joints such as the well known Rzeppa joint. This assures constant velocity operation of the output shaft 30 as opposed to fluctuating velocity about some average velocity if the slots 56, 58, 62 and 64 are straight and parallel to the axis 16. It will further be noted that the slots 56, 58, 62 and 64 are generally positioned whereby the balls 60 and 66 are between the first rotatable member 38 and the second rotatable member 40. Thus, the reason for allowing a gap between these members becomes apparent. It should also be noted that rotational imbalance is eliminated in a design as just described since the nutatable member 22 does not extend outwardly of the rotating structure 14 and no ground members or the like are carried by the nutatable member 22.

EMBODIMENT OF FIG. 2

Figure 2:
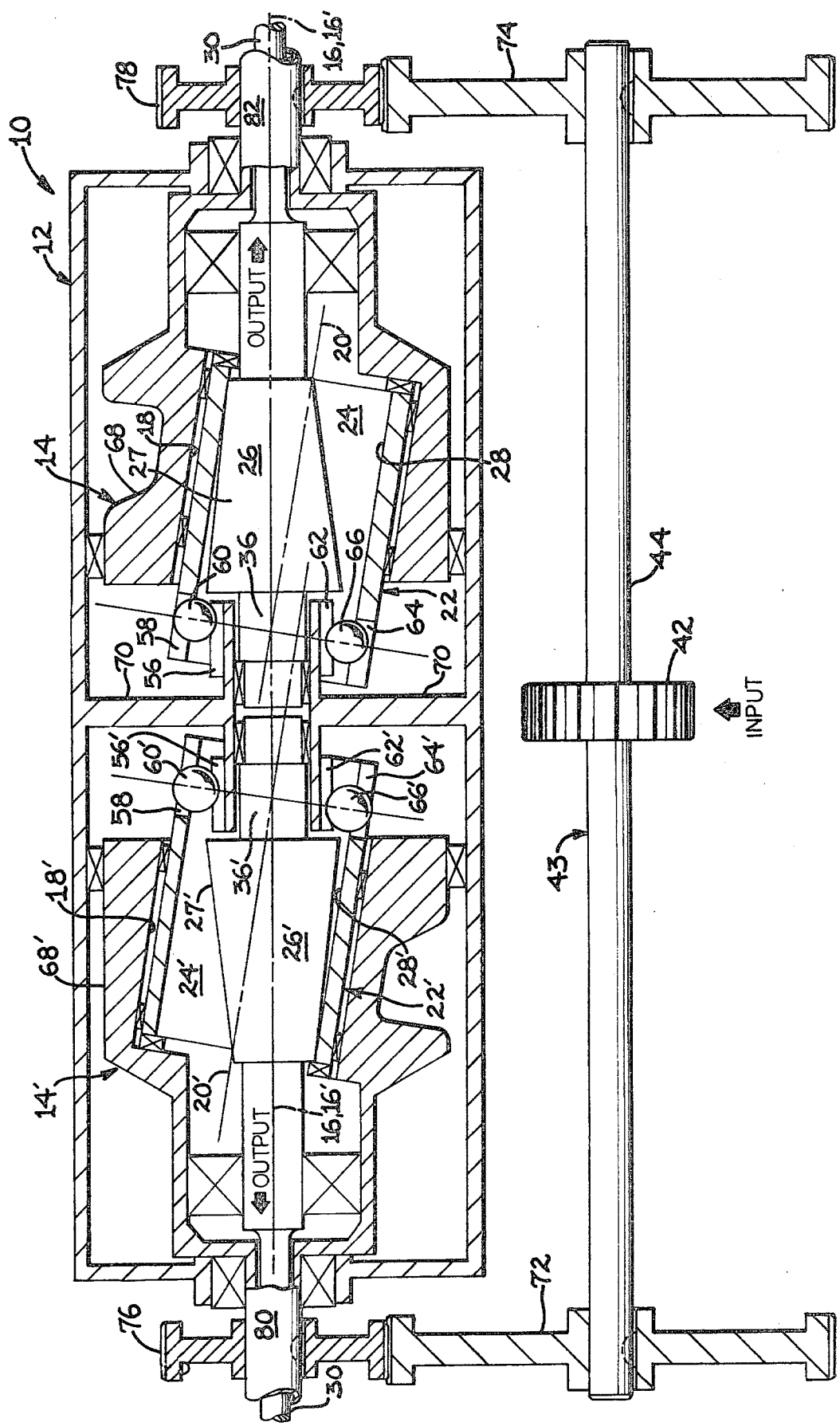
FIG. 2 illustrates in side sectional view, partially schematically, a second embodiment in accordance with the present invention.

Adverting now to FIG. 2 there is illustrated therein an embodiment which differs from the embodiment of FIG. 1 in several details. In the embodiment of FIG. 2 the rotatable structure 14 (on the righthand side of FIG. 2) comprises a single rotatable member 68 about the first mentioned nutatable member 22. The slots 56 and 62 carried by the case 12 are provided interiorly of the central cylindrical void 24 and proceed inwardly from an appropriate structural support member 70. Other than this minor structural difference they operate exactly as do the similar slot-ball arrangements 56, 58, 60 and 62, 64, 66, illustrated in FIG. 1.

In the embodiment of FIG. 2 (lefthand portion) there is also provided an additional outer rotatable structure 14' within the case 12 free from connection with and spaced axially from the first mentioned rotatable member 68, the additional rotatable structure 68' rotating about its rotational axis 20' and having an additional generally cylindrical cavity 18' axially therein, the axis 20' of said additional cavity 18' being at an (non-zero) angle from the axis 16' of the additional rotatable structure 14'. The embodiment of FIG. 2 also includes an additional generally cylindrical nutatable member 22' nutatingly mounted within the additional generally cylindrical cavity 18' and having an additional generally central cylindrical void 24' coaxially therein. An additionally generally conically surfaced roller 26' is in (frictional) contact with an additional generally cylindrical interior wall 28' defining the additional generally cylindrical void 24'. The additional roller 26' has an additional output shaft 30' extending therefrom generally coaxially with the axis 16 of the additional mentioned output shaft 30. The rollers 26 and 26' can be connected via stub shafts 36 and 36' or can be spaced apart and out of contact as illustrated to allow different torques and speeds to potentially be delivered at the respective output shafts 30 and 30'. An additional first slot 56' is carried interiorly by the case 12. An additional second slot 58' is carried by the additional nutatable member 22', the additional first slot 56' and the additional second slot 58' being aligned adjacent to one another. Means are provided carried by the aligned slots 56', 58' for preventing the additional nutatable member 22' from rotating while allowing full nutational motion. In the particular embodiment illustrated this means comprises a ball 60' of larger diameter than the respective widths of the additional first slot 56' and the additional second slot 58', the ball 60' being positioned in both the first additional slot 56' and the second additional slot 58'. Similar to the embodiment of FIG. 1, it is preferred that at least one, and more preferably at least two, equally spaced additional ball-slot arrangement 62', 64', 66' be provided for balance and smooth operation.

Means are provided for drivingly rotating the first mentioned rotatable member 68 and the additional rotatable member 68' from a common input 42. In the embodiment illustrated this driving means comprises the shaft 44 driven by the input gear 42, the shaft 44 driving a pair of identical gears 72 and 74 which in turn drive a pair of also identical gears 76 and 78. The gear 76 has acting as the shaft thereof a sleeve 80 and the gear 78 has acting as the shaft thereof a sleeve 82. As will be noted by reference to FIG. 2, the sleeve 80 surrounds and is spaced from the output shaft 30' and the sleeve 82 surrounds and is spaced from the output shaft 30. The input sleeve shafts 80 and 82 respectively directly drive the rotatable structures 68' and 68.

As with the embodiment of FIG. 1, the universal joint means 56, 58, 60; 62, 64, 66; 56', 58', 60'; and 62', 64', 66' allow complete nutational motion of the respective nutatable members 22 and 22' while preventing rotation thereof. Further, this desirable result is provided without the use of any ground members extending from either of the nutatable members 22 and 22', and, further, without the creation of any rotational imbalance in the overall system.

As a still further feature of the embodiment of FIG. 2, the two output shafts 30 and 30' can provide any desired power output ratio. Yet further, the overall system of the rotatable structures 14 and 14', the nutatable members 22 and 22' and the rollers 26 and 26', is rotationally balanced.

EMBODIMENT OF FIG. 3

Figure 3:
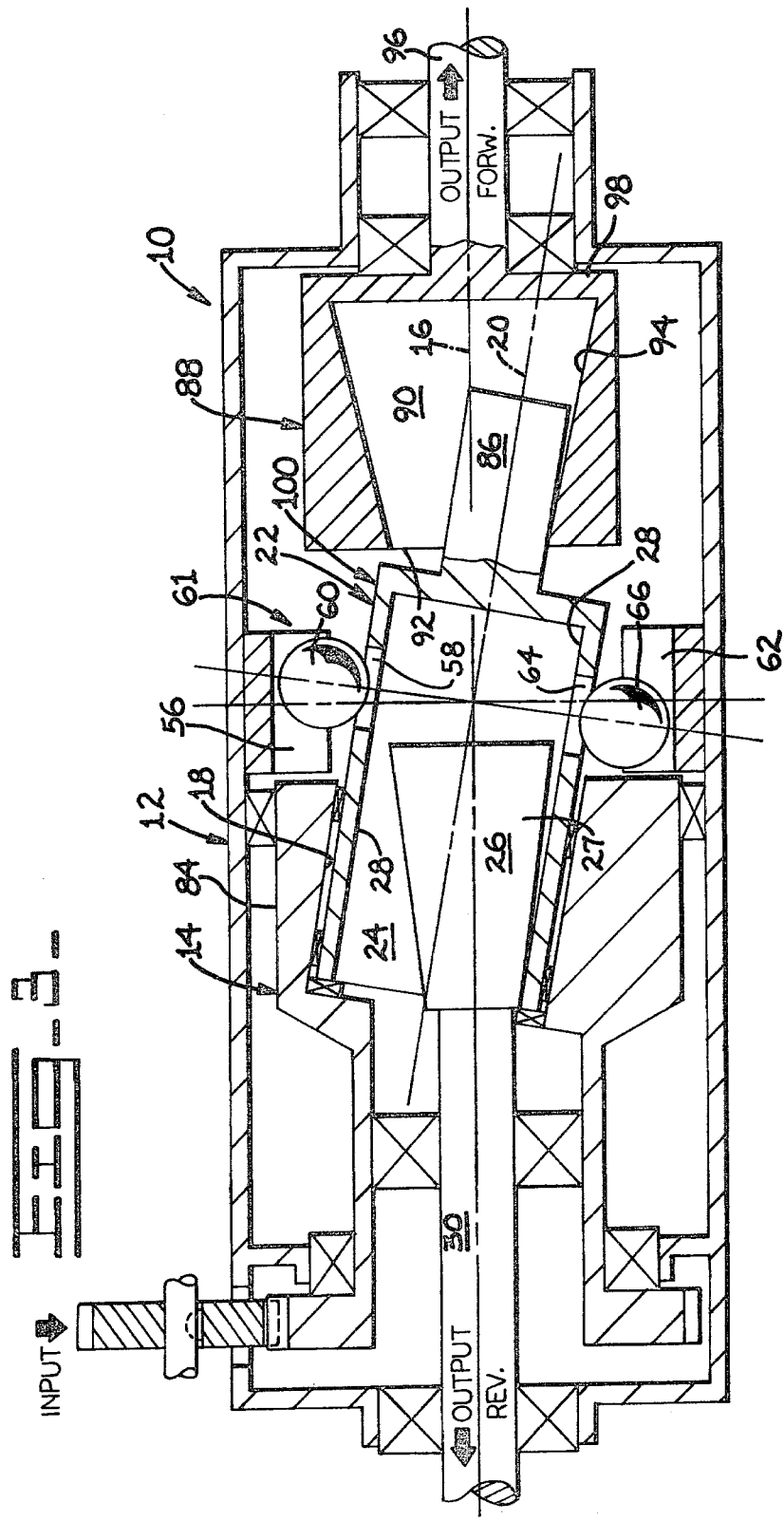
FIG. 3 illustrates in side sectional view, partially schematically, a third embodiment in accordance with the present invention.

The embodiment of FIG. 3 allows both forward and reverse power to be taken from the same nutating drive arrangement. That is, two output shafts are provided in the embodiment of FIG. 3 with these two shafts rotating in opposite angular directions. Adverting specifically to FIG. 3, it will be seen that the rotatable structure 14 comprises a single rotatable member 84. A single nutatable member 22 is provided which rotates within the central generally cylindrical cavity 18 formed within the rotatable member 84. A generally conically surfaced roller 26 fits within the generally cylindrical void 24 formed within the nutatable member 22. The conically shaped roller 26 is in (frictional) contact with the generally cylindrical interior of the wall 28 defining the generally cylindrical void 24. An output shaft 30 proceeds from the roller 26 as with other embodiments of the invention. Balls 60 and 66 cooperate as in other embodiments of the invention with respective slots 56, 58 and 62, 64.

The embodiment of FIG. 3 varies from that of FIG. 1 primarily in that a nutatable shaft 86 is provided which extends axially from the nutatable member 22 in generally an opposite direction from the output shaft 30. It will be noted that, in effect, the nutatable shaft 86 nutates about the axis 16 of the rotatable member 84. A rotatable output member 88 is provided which has a central generally conically surfaced void 90 defined therein generally coaxial with the axis 16 of the rotatable structure 14. The nutatable shaft 86 enters a smaller end 92 of the generally conically surfaced void 90 and drivingly bears against the generally conical surface 94 thereof. Thus, the rotatable output member 88 is caused to rotate by the contact between the nutatable shaft 86 and the surface 94 which defines the generally conically shaped void 90. What results is substantially a reversal of components with the nutatable shaft 86 having a generally cylindrical surface and the void 90 having a generally conical surface 94. It should be noted that the shaft 86 can be generally conical rather than generally cylindrical as illustrated if the void 90 is made generally cylindrical instead of generally conical as illustrated. An additional output shaft 96 extends from an end 98 of the rotatable output member 88 which is removed from the nutatable shaft 86. The additional output shaft 96 is generally coaxial with the axis 16 of the rotatable structure 14 and, hence, is generally coaxial with the output shaft 30. The additional output shaft 96 proceeds in a direction opposite that of the first output shaft 30 and rotates in an opposite angular direction from the first output shaft 30 as will be apparent.

As with the previously described embodiments of the present invention, the universal joint type connection between the case 12 and the nutatable member 22, which allows full nutational motion to the nutatable member 22 but prevents rotation thereof, is accomplished without rotational imbalancing of the overall system by mounting the universal constant velocity joint adjacent the center of gravity of a nutating structure 100 which includes the nutatable member 22 and the nutatable shaft 86 and by appropriately selecting the relative weights of the rotatable member 22, the nutatable shaft 86, the rotatable member 84 and the rotatable output member 88.

It should further be noted that with each embodiment of the invention as illustrated, appropriate bearings are provided as indicated schematically to allow the various relative motions. For example, in the embodiment of FIG. 3 two spaced apart bearings support the output shaft 30 and two other spaced apart bearings support the additional output shaft 96.

INDUSTRIAL APPLICABILITY

The invention functions and is useful in substantially any nutating drive arrangement, for example, in vehicles. High rotational speeds can be utilized within the drive because of the overall rotational balance thereof.

Other aspects, objects and advantages of this invention can be obtained from a study of the drawings, the disclosure and the appended claims.

What is claimed is:

1. In a nutating drive (10) having an outer rotatable structure (14) having a rotational axis (16), a generally cylindrical cavity (18) axially therein, an axis (20) of said cavity (18) being at an angle relative to the rotational axis (16) of said rotatable structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means (56, 58, 60) including a relatively stationary structure (12) having a first axially extending slot (56), a second axially extending slot (58) carried by said nutatable member (22) and aligned adjacent said first slot (56), and a member (60) positioned in and carried by said aligned slots (56 and 58), said member (60) being of larger dimension than the respective widths of said first (56) and second (58) slots.

2. The improvement, as set forth in claim 1, wherein said relatively stationary structure (12) comprises a case (12) about said rotatable structure (14), said generally cylindrical nutatable member (22) has walls defining a generally cylindrical void (24) and said conically surfaced member (26) is a roller.

3. In a nutating drive (10) having an outer rotatable structure (14) having a rotational axis (16), a generally cylindrical cavity (18) axially therein, an axis (20) of said cavity (18) being at an angle relative to the rotational axis (16) of said rotatable structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means (56, 58, 60) including a relatively stationary structure (12) having a first axially extending slot (56), a second axially extending slot (58) carried by said nutatable member (22) and aligned adjacent said first slot (56) and a ball (60) of larger diameter than the respective widths of said first (56) and second (58) slots, said ball (60) being positioned in and carried by both said first (56) and second (58) slots.

4. The improvement, as set forth in claim 3, wherein:
  the stationary structure (12) has a plurality of axially extending first slots (56), the nutatable member (22) has a plurality of respective axially extending second slots (58) and there are a plurality of said balls (60) each positioned in respective pairs of first (56) and second (58) slots.

5. In a nutating drive (10) having an outer rotatable structure (14) having a rotational axis (16), a generally cylindrical cavity (18) axially therein, an axis (20) of said cavity (18) being at an angle relative to the rotational axis (16) of said rotational structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance;

a second member (32 or 26') having a surface (27') and being of a generally conical configuration with said surface being in contact with said cylindrical surface, said second generally conically surfaces member (32 or 26') extending from the first generally conically surfaced member (26) and being oriented generally coaxial with said output surface (30) and extending from the first conically surfaced member (26) in an opposed direction relative to said output shaft (30);

said rotatable structure (14) including a first rotatable member (38 or 68) positioned generally about said first conically surfaced member (26) and a second rotatable member (40 or 68') positioned generally about said second conically surfaced member (32 or 26'), said first (38 or 68) and second (40 or 68') rotatable members being free from connection of one to the other, said maintaining means being located between said first (38 or 68) and second (40 or 68') rotatable members; and means (43) for rotating said first (38 or 68) and second (40 or 68') rotatable members from a common input (42).

6. The improvement as set forth in claim 5, wherein said maintaining means includes:
  a relatively stationary structure (12) having a first axially extending slot (56);
  said nutatable member (22) having a second axially extending slot (58) aligned adjacent said first slot (56); and
  a member (60) positioned in and carried by said aligned slots (56 and 58), said member (60) being of larger dimension than the respective widths of said first (56) and second (58) slots.

7. The improvement, as set forth in claim 5, including:
  bearing means (34) for maintaining said second generally conically surfaced member (32) generally coaxial with said first conically surfaced member (26).

8. In a nutating drive (10) having an outer rotatable structure (14) having a rotational axis (16), a generally cylindrical cavity (18) axially therein, an axis (20) of said cavity (18) being at an angle relative to the rotational axis (16) of said rotational structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means including a relatively stationary structure (12) having a first axially extending slot (56), a second axially extending slot (58) carried by said nutatable member (22) and aligned adjacent said first slot (56), and a member (60) carried by said aligned slots (56 and 58), said slot carried member being a ball (60) of larger diameter than the respective widths of said first (56) and second (58) slots, said ball (60) being positioned in both said first (56) and second (58) slots, and wherein:

the stationary structure (12) has a plurality of axially extending first slots (56), the nutatable member (52) has a plurality of respective axially extending second slots (58) and a plurality of said balls (60), each positioned in respective pairs of first (56) and second (58) slots.

9. In a nutating drive (10) having an outer rotatable structure (14) having a rotational axis (16), a generally cylindrical cavity (18) axially therein, an axis (20) of said cavity (18) being at an angle relative to the rotational axis (16) of said rotational structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance;

a nutatable shaft (86) attached to said nutatable member (22) and extending generally axially therefrom in generally an opposite direction from said output shaft (30);

a rotatable output member (88) having an internal surface (94) defining a void (90) of generally conical configuration and being generally coaxial with the axis of said rotatable structure (14), said nutatable shaft (86) entering a smaller end of said conical void (80) and bearing against the conical surface (94); and a second output shaft (96) extending from an end of said rotatable output member (88) and being spaced from said nutatable shaft (86), said second output shaft (96) being generally coaxial with the axis of said outer rotatable structure (14), extending from the rotatable output member (88) in a direction away from said output shaft (30) and rotating in an opposed direction relative to said output shaft (30).

10. The improvement as set forth in claim 9, wherein said maintaining means includes:
a relatively stationary structure (12) having a first axially extending slot (56);
said nutatable member (22) having a second axially extending slot (58) aligned adjacent said first slot (56); and
a member (60) carried by said aligned slots (56 and 58).

11. In a nutating drive (10) having an outer rotatable structure (14) having a rotational axis (16), a generally cylindrical cavity (18) axially therein, an axis (20) of said cavity (18) being at an angle relative to the rotational axis (16) of said rotational structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means (56, 58, 60) including a relatively stationary structure (12) having a first axially extending slot (56), a second axially extending slot (58) carried by said nutatable member (22) and aligned adjacent said first slot (56), and a member (60) carried by said aligned slots (56 and 58), said slot carried member (60) being a ball (60) of larger diameter than the respective widths of said first (56) and second (58) slots, said ball (60) being positioned in both said first (56) and second (58) slots;

a nutatable shaft (86) attached to said nutatable member (22) and extending generally axially therefrom in generally an opposite direction from said output shaft (30);

a rotatable output member (88) having an internal surface (94) defining a void (90) of generally conical configuration and being generally coaxial with the axis of said rotatable structure (14), said nutatable shaft (86) entering a smaller end of said conical void (90) and bearing against the conical surface (94): and a second output shaft (96) extending from an end of said rotatable output member (88) and being spaced from said nutatable shaft (86), said second output shaft (96) being generally coaxial with the axis of said outer rotatable structure (14), extending from the rotatable output member (88) in a direction away from said output shaft (30) and rotating in an opposed direction relative to said output shaft (30).

12. The improvement, as set forth in claim 11, wherein:
the stationary structure (12) has a plurality of axially extending first slots (56), the nutatable member (22) has a plurality of respective axially extending second slots (58) and there are a plurality of said balls (60) each positioned in respective pairs of first (56) and second (58) slots.

13. In a nutating drive (10) having an outer rotatable structure (14) having a rotational axis (16), a generally cylindrical cavity (18) axially therein, an axis (20) of said cavity (18) being at an angle relative to the rotational axis (16) of said rotational structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means (56, 58, 60) including a relatively stationary structure (12) having a first axially extending slot (56), a second axially extending slot (58) carried by said nutatable member (22) and aligned adjacent first slot (56) and a member (60) carried by said aligned slots (56 and 58);

a second outer rotatable structure (68') having a rotational axis and being free from connection to said first rotatable structure (68), said second rotatable structure (68') having a second cylindrical cavity (18') axially therein, an axis of said second cavity (18') being at an angle relative to the rotational axis of said second rotatable structure (68');

a second generally cylindrical nutatable member (22') nutatably movable within said second cavity (18');

a second member (26') having a surface (27') of a generally conical configuration with said surface being in frictional contact with a generally cylindrical surface (28') of said second generally cylindrical nutatable member (22'), said second generally conically surfaced member (26') having a second output shaft (20') generally coaxial with the rotational axis of said second rotatable structure (14'), said second output shaft (30') extending from said first conically surfaced member (26) in an opposed direction relative to said first output shaft (30);

said relatively stationary structure (12) having an additional first axially extending slot (56');

said second nutatable member (22'), having an additional second slot (58'), said first (56') and second (58') additional slots being aligned adjacent one another; and a member (60') carried by said aligned additional slots (56', 58').

14. An improvement as in claim 13, wherein: the stationary structure (12) has a plurality of axially extending first slots (56), the nutatable member (22) has a plurality of respective axially extending second slots (58) and there are a corresponding plurality of said slot carried members (60); and the stationary structure (12) has a plurality of additional axially extending first slots (56', 62'), the additional nutatable member (22') has a plurality of additional axially extending second slots (58', 64') and there are a corresponding plurality of said additional slots carried members (60', 66').

15. An improvement as in claim 13, including: means (43) for rotating said first (68) and second (68') rotatable members from a common input (42).

16. An improvement as in claim 15, wherein said rotating means comprises an input sleeve (82) radially about and spaced from said first output shaft (30), an additional input sleeve (80') radially about and spaced from said additional output shaft (30') and means (44, 72, 74, 76, 78) for simultaneously rotating said first (82) and additional (80) input sleeves.

17. An improvement as in claim 13, wherein said relatively stationary structure is a case (12) about said first (68) and additional (68') rotatable structures, said first (22) and additional (22') nutatable members each have walls defining respective cylindrical voids (24,24'), and said first (26) and additional (26') conically surfaced members are rollers.

18. In a nutating drive (10) having an outer rotatable structure (14) having a rotational axis (16), a generally cylindrical cavity (18) axially therein, an axis (20) of said cavity (18) being at an angle relative to the rotational axis (16) of said rotational structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means (56, 58, 60) including a relatively stationary structure (12) having a first axially extending slot (56), a second axially extending slot (58) carried by said nutatable member (22) and aligned adjacent said first slot (56), and a member (60) carried by said aligned slots (56 and 58);

a second outer rotatable structure (68') having a rotational axis and being free from connection to said first rotatable structure (68), said second rotatable structure (68') having a second cylindrical cavity (18') axially therein, an axis of said second cavity (18') being at an angle relative to the rotational axis of said second rotatable structure (68');

a second generally cylindrical nutatable member (22') nutatably movable within said second cavity (18');

a second member (26') having a surface (27') of a generally conical configuration with said surface being in frictional contact with a generally cylindrical surface (28') of said second generally cylindrical nutatable member (22'), said second generally conically surfaced member (26') having a second output shaft (20') generally coaxially with the rotational axis of said second rotatable structure (14'), said second output shaft (30') extending from said first conically surfaced member (36) in an opposed direction relative to said first output shaft (30);

said relatively stationary structure (12) having an additional first axially extending slot (56')

said second nutatable member (22'), having an additional second slot (58'), said first (56') and second (58') additional slots being aligned adjacent one another;

a member (60') carried by said aligned additional slots (56', 58');

said stationary structure (12) having a plurality of axially extending first slots (56), said nutatable member (22) having a plurality of respective axially extending second slots (58) and wherein there are corresponding plurality of said slot carried members (60);

said stationary structure (12) having a plurality of additional axially extending first slots (56', 62'), said additional nutatable member (22') having a plurality of additional axially extending second slots (58', 64') and wherein there are a corresponding plurality of said additional slots carried members (60', 66');

each of said first slots (56) carried members (60) being a ball (60) of larger diameter than the respective widths of said first (56) and second (58) slots, said ball being positioned in both said first (56) and second (58) slots, and wherein each of said additional slots carried members (60', 66') is an additional ball (60', 66') of larger diameter than the respective widths of said first (56', 62') and second (58', 64') additional slots, said additional balls (60', 66') being positioned in both said first (56', 62') and second (58', 64') additional slots.

19. In a nutating drive (10) having an outer rotatable structure (14) having a rotational axis (16), a generally cylindrical cavity (18) axially therein, an axis (20) of said cavity (18) being at an angle relative to the rotational axis (16) of said rotatable structure (14), a generally cylindrical nutatable member (22) nutatingly movable within said cavity (18) and a member (26 or 88 ) having a surface (27 or 94) of a generally conical configuration with said surface (27 or 94) being in contact with a generally cylindrical surface (28 or 86) of said nutatable member (22), said generally conically surfaced member (26 or 88) having an output shaft (30 or 96) generally coaxial with the rotational axis (16) of said rotatable structure (14), the improvement comprising:

means (56, 58, 60) for maintaining said nutatable member (22) against rotation while maintaining substantially full nutational freedom of said nutatable member (22) and while maintaining said drive (10) in overall rotational balance, said maintaining means (56, 58, 60) including a relatively stationary structure (12) having a first axially extending slot (56), a second axially extending slot (58) carried by said nutatable member (22) and aligned adjacent said first slot (56), and a member (60) carried by said aligned slots (56 and 58);

a second outer rotatable structure (68') having a rotational axis and being free from connection to said first rotatable structure (68), said second rotatable structure (68') having a second cylindrical cavity (18') axially therein, an axis of said second cavity (18') being at an angle relative to the rotational axis of said second rotatable structure (68');

a second generally cylindrical nutatable member (22') nutatably movable within said second cavity (18');

a second member (26') having a surface (27') of a generally conical configuration with said surface being in frictional contact with a generally cylindrical surface (28') of said second generally cylindrical nutatable member (22'), said second generally conically surfaced member (26') having a second output shaft (20') generally coaxially with the rotational axis of said second rotatable structure (14'), said second output shaft (30') extending from said first conically surfaced member (26) in an opposed direction relative to said first output shaft (30);

said relatively stationary structure (12) having an additional first axially extending slot (56');

said second nutatable member (22'), having an additional second slot (58'), said first (56') and second (58') additional slots being aligned adjacent one another;

a member (60') carried by said aligned additional slots (56', 58');

said member (60', 66') carried by said additional slots (56', 58', 62', 64') being an additional ball (60', 66') of larger diameter than the respective widths of said first (56', 62') and second (58', 64') additional slots, said additional balls (60', 66') being positioned in both said first (56', 62') and second (58', 64') additional slots.

20. In a nutating drive (10) having an outer rotatable structure (14) having a rotational axis (16), a generally cylindrical cavity (18) axially therein, an axis (20) of said cavity (18) being at an angle relative to the rotational axis (16) of said rotatable structure (14), a generally cylindrical nutatable member (22) nutatingly movable within said cavity (18) and a member (26 or 88) having a surface (27 or 94) of a generally conical configuration with said surface (27 or 94) being in contact with a generally cylindrical surface (28 or 88) of said nutatable member (22), said generally conically surfaced member (26 or 88) having an output shaft (30 or 96) generally coaxial with the rotational axis (16) of said rotatable structure (14), the improvement comprising:

a relatively stationary structure (12) having a portion thereof adjacent a central portion of said nutatable member (22);

means (56, 58, 60) for preventing said nutatable member from rotating and allowing substantially unencumbered nutating thereof; and means for mounting said rotating preventing and nutating allowing means between said central portion of said nutatable member (22) and said adjacent portion of said relatively stationary structure:

said means (56, 58, 60) for preventing rotating and allowing nutating including a first axially extending slot (56) carried by said relatively stationary structure, a second axially extending slot (58) carried by said nutatable member (22), and a ball (60) of larger diameter than the respective widths of said slots (56, 58) positioned therein.

21. In a nutating drive (10) which comprises an outer rotatable structure (14) rotatable about its rotational axis (16) and having a generally cylindrical cavity (18) axially therein, an axis (20) of said cavity being at an angle relative to the rotational axis (16) of said rotatable structure (14), a generally cylindrical nutatable member (22) nutatably mounted within said cavity (18) and a member (26) having a surface (27) of a generally conical configuration with said surface (27) being in frictional contact with a generally cylindrical surface (28) of said nutatable member (22), said generally conically surfaced member (26) having an output shaft (30) generally coaxial with the rotational axis (16) of said rotatable structure, the improvement comprising:

wherein said rotatable structure (14) includes a first rotatable member (38 or 68) and a second rotatable member (40 or 68'), said members being axially spaced from one another;

a generally universal joint (61) generally between said first (38 or 68) and second (40 or 68') rotatable members and in supporting communicating relation with a central portion of said nutatable member (22) and said relatively stationary structure (12); and means (43) for rotating said first (38 or 68) and second (40 or 68') rotatable members from a common input (42).

22. An improvement as in claim 21, wherein said generally universal joint (61) comprises a constant velocity joint.

23. In a nutating drive (10) which comprises an outer rotatable structure (14) rotatable about its rotational axis (16) and having a generally cylindrical cavity (18) axially therein, an axis (20) of said cavity being at an angle relative to the rotational axis (16) of said rotatable structure (14), a generally cylindrical nutatable member (22) nutatably mounted within said cavity (18) and a member (26) having a surface (27) of a generally conical configuration with said surface (27) being in frictional contact with a generally cylindrical surface (28) of said nutatable member (22), said generally conically surfaced member (26) having an output shaft (30) generally coaxial with the rotational axis (16) of said rotatable structure (14), the improvement comprising:

a nutatable shaft (86) substantially coaxial with, attached to, and extending from said nutatable member in a generally opposed direction from said output shaft (30) and defining with said nutatable member (22) a nutatable structure (100);

a rotatable output member (88) having a central void (90) coaxial with the rotational axis (16) of said rotatable structure (14) with said nutatable shaft (86) entering said void and bearing against said internal surface; and an additional output shaft (96) extending from an end of said rotatable output member (88) removed from said nutatable shaft (86), said additional output shaft (96) being coaxial with the rotational axis (16) of said rotatable structure (14), proceeding in a direction opposite that of said first output shaft (30) and being rotatable in an opposite angular direction from said first output shaft (30).

24. An improvement as in claim 23, including:

a generally universal joint (61) in supporting communicating relation with a central portion of said nutatable structure (22) and said relatively stationary structure (12).

25. An improvement as in claim 24, wherein said generally universal joint 61 is a constant velocity joint.

26. An improvement as in claim 25, wherein said nutatable shaft (86) is generally cylindrical, said central void (90) is generally conical and said nutatable shaft (86) enters said void (90) from a smaller end (92) thereof.

* * * * *